Patented June 19, 1951

2,557,782

UNITED STATES PATENT OFFICE 2,557,782

METHOD FOR MAKING CHLOROSIL-PHENANES AND PRODUCTS

Harold A. Clark, Midland, Mich., assignor to Dow Corning Corporation, Midland, Mich., a corporation of Michigan No Drawing. Application February 23, 1949, Serial No. 77,984

4 Claims. (Cl. 260—448.2)

This invention relates to the production of organo silicon polymers wherein the silicon atoms are linked by phenylene radicals.

Previously known methods of preparing compounds having the group $\equiv$SiRSi$\equiv$ consists of reacting a di-Grignard reagent of the type XMgRMgX with halogeno silanes. Such a method when employed in the production of the compounds of this invention results in formation of undesirable by-products. Furthermore, the Grignard method is unduly expensive.

It is an object of this invention to provide a convenient and economical method for the preparation of organo silicon polymers wherein the silicon atoms are linked by phenylene radicals.

In accordance with this invention a phenylchlorosilane of the type $(C_6H_5)_xSiCl_{4-x}$ where $x$ has a value from 1.5 to 2.9 in liquid phase is heated at a temperature of from 210° to 300° C. in contact with a minor amount of aluminum chloride.

When phenylchlorosilanes of the type above are heated with aluminum chloride a condensation reaction takes place to produce polymeric silanes with the concurrent elimination of benzene. In the polymeric silanes the silicon atoms are linked together through phenylene radicals and the remaining valences of the silicon are satisfied by monovalent substituents consisting of chlorine atoms or phenyl radicals. Each silicon atom has at least two monovalent substituents attached thereto. The polymer molecules are linear in structure and respond to the formula

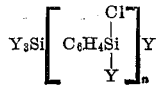

where Y is a chlorine atom or phenyl radical and $n$ has a value of at least 1.

The starting phenylsilane may be a mixture of phenyltrichlorosilane, diphenyldichlorosilane and triphenylchlorosilane or a combination of any two of these compounds or the starting phenyl silane may be diphenyldichlorosilane. In any event the phenylchlorosilane contains from 1.5 to 2.9 phenyl radicals per silicon atom.

The precise mechanisms by which the polymers are formed are not fully known. However, since benzene is one of the products it would appear that the polymerization proceeds by means of a cleavage of a phenyl radical from one silicon atom and the removal of hydrogen from a phenyl radical attached to another silicon atom. The latter will produce a phenylene radical which may become linked to a silicon from which a phenyl radical has been cleaved. The cleaved phenyl radical may then unite with hydrogen to form benzene. The reaction may be represented schematically as

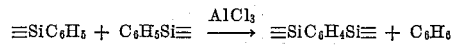

The preferred temperature range is from 210° to 250° C. At temperatures below 210° C. the condensation reaction does not proceed at any appreciable rate. The amount of aluminum chloride employed may be less than 50 percent by weight; however, the preferred range is from 0.001 to 10 percent by weight aluminum chloride based on the weight of the total phenylchlorosilane.

The polymers formed by the process of this invention vary from viscous liquids to thermoplastic resinous solids. They are soluble in organic solvents and are useful as intermediates in the production of fluid and resinous organo silane polymers and copolymers, which may be employed in a wide variety of applications such as lubricants, vacuum diffusion pump fluids, heat exchange media and coating agents.

In order that this invention may be better understood the following illustrative examples are given:

EXAMPLES

Example 1

A mixture of 1774 g. of diphenyldichlorosilane and 8.5 g. of aluminum chloride was heated at a temperature of from 210° to 250° C. for 48 hours. During this period benzene volatilized and collected as a distillate. The residual product was strip-distilled by heating at a temperature of from 210° C. to 250° C. at a pressure of 3 mm. of mercury. The following products were obtained from the reaction:

| | G. |
|---|---|
| Total benzene collected | 283 |
| $C_6H_5SiCl_3$ | 73 |
| $(C_6H_5)_3SiCl$ | 96 |
| Cut 3 | 192 |
| Residue | 668 |

Cut 3 distilled from 210° to 250° C. at 3 mm. of mercury and of the total amount obtained 112 g. came over at 210° to 215° C. at 3 mm. of mercury. Analysis of this cut showed it to consist of the dimer

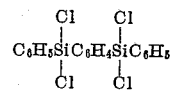

The residue which was non-distillable at the temperature and pressure employed was a viscous resinous material comprising a mixture of compounds having the formula

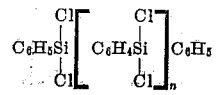

Example 2

5 g. of aluminum chloride was added to an equimolar mixture of 265 g. of triphenylchlorosilane and 190 g. of phenyltrichlorosilane. The mixture was heated at from 195° to 205° C. for 15 hours. No product distilled under these conditions. The temperature was then raised to 210° C. and the distillation of benzene began. Heating at 210° C. was continued for 8 hours and the reaction product was then strip-distilled at a temperature of 210° C. and at a pressure of 3 mm. of mercury.

The reaction products obtained were 70 g. benzene, 53 g. phenyltrichlorosilane, 72 g. diphenyldichlorosilane and 255 g. of a viscous thermoplastic residue. This material comprised a mixture of compounds having the formulae

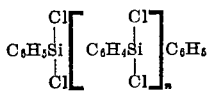

and

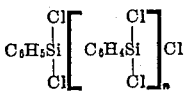

Example 3

A mixture of 478 g. of diphenyldichlorosilane and 24 g. of aluminum chloride was heated for 2.5 hours at a temperature of from 210° to 250° C. 73 g. of benzene were collected as a distillate during said period. The residual mixture was fractionally distilled at a pressure of 3 mm. of mercury. The polymeric condensation products obtained were 41 g. of liquid distilling at 210° to 250° C. at 3 mm. of mercury and 166 g. of non-volatile residue. The volatile polymer was the compound

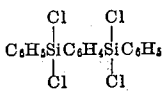

while the residue was a thermoplastic solid which contained two atoms of hydrolyzable chlorine per silicon atom. It was a mixture of compounds responding to the formula

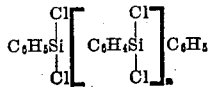

Example 4

A mixture of 1100 g. of triphenylchlorosilane, 800 g. of diphenyldichlorosilane and 19 g. of aluminum chloride was heated at 240° to 255° C. for 72 hours. 424 g. of benzene distilled. The residue was a non-volatile solid which melted to a viscous liquid at 200° C. This material contained hydrolyzable chlorine and comprised a mixture of polymers having the formulae

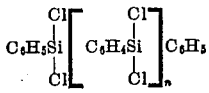

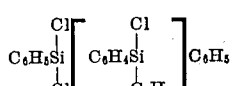

and

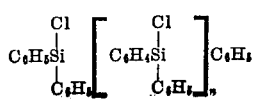

Example 5

7 g. of aluminum chloride was added to an equimolar mixture of 372 g. of diphenyldichlorosilane and 310 g. of monophenyltrichlorosilane. The mixture was heated 48 hours at 245° C. 140 g. benzene distilled. The residue was then strip-distilled at a temperature from 150° C. to 250° C. at a pressure of 3 mm. of mercury. There was obtained 155 g. of phenyltrichlorosilane, 75 g. of diphenyldichlorosilane, 90 g. of the dimer

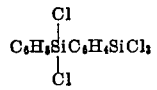

boiling point 163° to 165° C. at 3 mm. of mercury and 215 g. of a viscous thermoplastic residue. The residue contained hydrolyzable chlorine and was a mixture of polymers having the formulae

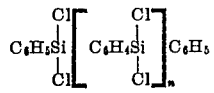

and

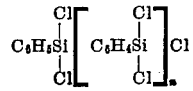

That which is claimed is:

1. A method of preparing linear organo silane polymers in which the silicon atoms are linked by phenylene radicals and the remaining valences of the silicon are satisfied by chlorine atoms and phenyl radicals, which method comprises heating phenylchlorosilanes of the formula $$(C_6H_5)_xSiCl_{4-x}$$

where $x$ has a value from 1.5 to 2.9 in liquid phase at a temperature of from 210° to 300° C. in contact with from 0.001 to 10 percent by weight of aluminum chloride based upon the total weight of the chlorosilane.

2. 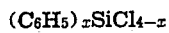

3. 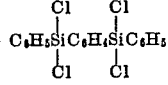

4. 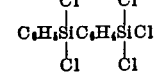

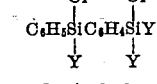

where each Y is selected from the group consisting of phenyl radicals and chlorine atoms.

HAROLD A. CLARK.

REFERENCES CITED

The following references are of record in the file of this patent:

UNITED STATES PATENTS

| Number | Name | Date |
|---|---|---|
| 2,352,974 | Rochow | July 4, 1944 |
| 2,389,477 | Wright et al. | Nov. 20, 1945 |

OTHER REFERENCES

Evison et al.: Journ. Chem. Soc. (London), vol. 134, 1931, pages 2774–8.

Whitmore et al.: J. Amer. Chem. Soc., vol. 69, 1947, page 2108.

Gruttner et al.: Berichte Deut., Chem. Gesel., vol. 51, 1918, pp. 1283 to 1285.